United States Patent
Fuhrman et al.

(10) Patent No.: US 8,566,633 B2
(45) Date of Patent: Oct. 22, 2013

(54) METHOD OF DYNAMIC ALLOCATION ON A STATICALLY ALLOCATED AND EMBEDDED SOFTWARE ARCHITECTURE

(75) Inventors: Thomas E. Fuhrman, Shelby Township, MI (US); Sandeep Menon, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 377 days.

(21) Appl. No.: 13/024,695

(22) Filed: Feb. 10, 2011

(65) Prior Publication Data

US 2012/0210160 A1 Aug. 16, 2012

(51) Int. Cl.
*G06F 11/00* (2006.01)
(52) U.S. Cl.
USPC .............................. 714/3; 714/4.11
(58) Field of Classification Search
USPC ................ 714/3, 4.1, 4.11, 4.21, 4.5
See application file for complete search history.

(56) References Cited

U.S. PATENT DOCUMENTS

| | | | |
|---|---|---|---|
| 5,919,266 A * | 7/1999 | Sud et al. | 714/13 |
| 6,598,229 B2 * | 7/2003 | Smyth et al. | 725/107 |
| 6,628,649 B1 * | 9/2003 | Raj et al. | 370/360 |

* cited by examiner

*Primary Examiner* — Dieu-Minh Le
(74) *Attorney, Agent, or Firm* — Quinn Law Group, PLLC

(57) ABSTRACT

A method of dynamically allocating a task or a signal on a statically allocated and embedded software architecture of a vehicle includes identifying a faulty component. The faulty component may include a software component, a hardware component or a signal or communications link between components. Once the faulty component is identified, any tasks performed by or signals associated with the faulty component are identified, and the tasks performed by or the signals associated with the faulty component are re-allocated to an embedded standby component so that performance of the re-allocated task and/or signal for future system operations is performed by the standby component.

15 Claims, 3 Drawing Sheets

METHOD OF DYNAMIC ALLOCATION ON A STATICALLY ALLOCATED AND EMBEDDED SOFTWARE ARCHITECTURE

TECHNICAL FIELD

The invention generally relates to a method of dynamically allocating a task and/or data/signal information on a statically allocated and embedded software architecture of a vehicle.

BACKGROUND

Embedded software architectures or platforms (middleware and real time operating systems) used in the automobile industry, such as OSEK and AUTOSAR, are statically configured at design time with a fixed set of operating system tasks. All tasks that will ever execute on a given computing hardware node are allocated at the time the executable image is built (compiled and linked).

Software-based electronic control systems are increasingly being used in the automobile industry to control active safety and autonomous driving features that impact the motion and dynamic stability of the vehicle. As the levels of control intelligence, automated decision making, and control authority over actuators implemented in software continues to increase, these control systems become more and more critical. The software, hardware, and system architectures of these control systems must therefore be fault-tolerant, and in some cases, even fail-operational. This requires that redundant software, computing hardware, sensors, actuators, and network communication components must be designed into the system so that if one component fails, another component is available to continue to provide a safe level of functionality, whether in a full-performance mode or in a degraded-performance mode.

Redundant hardware components must be statically designed into the system, because one cannot easily add new hardware (sensors, actuators, computers, communication links, wiring harnesses) into a vehicle that is in the middle of a driving cycle. Redundant software components, on the other hand, may be either statically or dynamically allocated into the system.

Each of the redundant instantiations of the critical software and/or hardware components must be capable of transmitting and/or receiving data and/or signal information across the vehicle network. These redundant instantiations of the software and/or hardware components which co-exist and transmit their respective own unique output signals requires duplication of network signal information at the data dictionary level, and receiver side processing/selection of redundant messages, thereby increasing network bandwidth, message priority and its allocation in the data dictionary. Additionally, data dictionary changes would be required to introduce scalability to create additional redundant instantiations of the critical software.

SUMMARY

A method of dynamically allocating one of a task and data/signal information on a statically embedded architecture of a vehicle is provided. The method includes analyzing a system operation to identify a faulty component, identifying one of a task performed by the identified faulty component and data/signal information associated with the faulty component, and re-allocating the one of the task performed by and the data/signal information associated with the faulty component to a statically allocated and embedded standby component. The task is re-allocated so that performance of the re-allocated task for future system operations is performed by the standby component. The data signal information is re-routed so that input and output signals information for future system operations is provided from/to the standby component for the redundant task.

A system for dynamically allocating one of a task and data/signal information on a statically embedded architecture of a vehicle is also provided. The system includes a network, and a plurality of electronic control units in operative communication with each other and with the network. Each of the plurality of electronic control units includes a local symptom collector, and at least one of the plurality of electronic control units includes a state of health determination module. The state of health determination module is in operative communication with the plurality of electronic control units and the network. The state of health determination module is configured to identify a fault condition using an output from the local symptom collectors, and provide fault condition information to a reconfiguration manager. The reconfiguration manager is configured to trigger reallocation of at least one of a task or data/signal information associated with the identified faulty condition.

Accordingly, the method implements dynamic software and/or hardware reallocation (sometimes referred to as dynamic reconfiguration), in response to an identified faulty component, on top of an existing embedded software platform that supports only static allocation of software components, thereby improving the efficiency of the network architecture.

The above features and advantages and other features and advantages of the present invention are readily apparent from the following detailed description of the best modes for carrying out the invention when taken in connection with the accompanying drawings.

DETAILED DESCRIPTION

Figure 1:
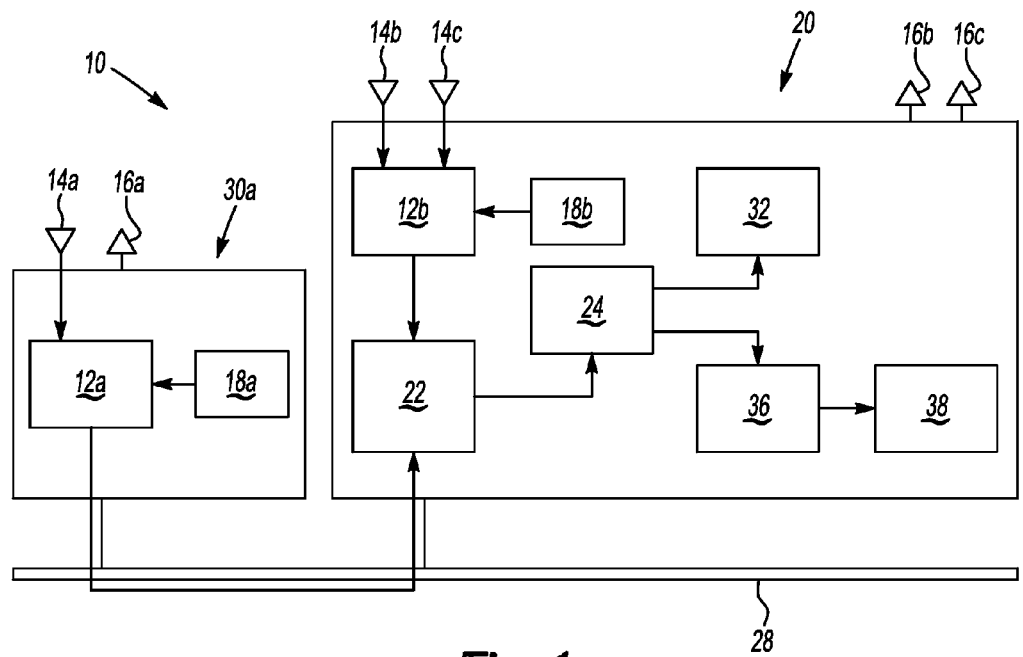
FIG. 1 is a schematic diagram of a vehicle network.

Referring to the Figures, wherein like numerals indicate like parts throughout the several views, a vehicle network is generally shown at 10 in FIG. 1. There are two aspects to consider in the design and implementation of a dynamic software allocation scheme on top of a software platform that supports only static software allocation. One aspect deals with control-flow, while the other aspect deals with data-flow. Control-flow deals with how the software components are triggered, or activated, while data-flow deals with how the inputs and outputs of the software component are connected to the remainder of the system even after the software component is moved (re-allocated) to a different computing node.

The control-flow of the dynamic software allocation scheme deals with the manner in which execution of software components are triggered or activated. In a statically allocated and embedded network architecture, all tasks must be preallocated at system build time as specified in a static task table. For example, in the OSEK operating system that is typically used in the automobile industry, the OIL (OSEK Implementation Language) configuration file specifies exactly the complete set of tasks that will be available to execute on a given node for the entire life of the system.

A method that mimics dynamic software task allocation on a statically-allocated software architecture is herein disclosed. The method includes first conducting a safety analysis by identifying faults to be considered (fault model), hazard analysis, and risk assessment. For each hazard, depending on its risk assessment (likelihood and severity), a safety goal is defined which specifies the safe response or action to the hazard, whether to fail silently to a safe state or to continue operating with degraded or full functionality. Next, a system redundancy architecture is designed to accommodate the defined safety goals. The redundancy architecture specifies the required levels of redundancy for sensors, actuators, computers, communication links, and software components. After this, a fault management scheme is designed consisting of a dynamic re-allocation or reconfiguration plan for which software components need to have redundant copies, and where those redundant copies will execute in the final system, in response to fault events or conditions. Finally, instances of each software component in that plan are statically allocated as a task on each computing node upon which it is ever intended to run according to the reconfiguration plan. An operating system 42 event is also statically defined and allocated for each such software component, which will serve as the triggering mechanism corresponding to that task.

In each Electronic Control Unit (ECU) of the network 10, i.e., in each computing node, a "Local Symptom Collector" is used to gather information local to the node relevant to evaluating the overall system state of health. This information, from all nodes, is transmitted to one or more "system state of health determination modules" which evaluate the complete set of symptoms and determine which fault events or conditions are present. For redundancy purposes, multiple copies of this system state of health determination module may run on different nodes, and they may communicate with each other and agree among themselves on the state of health of the entire system (vehicle), that is, which components are faulty. To establish this agreement, they may use an agreement protocol. This information on agreed-upon system-level fault events and conditions is sent to one or more "reconfiguration managers" on individual nodes in the system, where decisions are made on how to dynamically re-allocate or reconfigure software components and/or signal or communication links Once this decision is made on where new software components need to be allocated or on where new communications links or signals need to be allocated, this information is passed to one of a "Reconfiguration Event Generator" or a "Reconfiguration Signal Generator" on each node upon which new software components, or the new signal or communication links are to be allocated. These events are passed to middleware 38 and operating system components, which will mimic dynamic software allocation by initiating statically-resident but inactive software components on that node, or by establishing communication links between components.

The system-level network architecture shown in FIG. 1 is used to implement the dynamic reconfiguration scheme described above. The network 10 includes a first Electronic Control Unit (ECU) 20 and a second ECU 30a. The first ECU 20 and the second ECU 30a are connected through a network bus 28 so that information may be transferred and shared therebetween. The second ECU 30a is associated with and connected to a first sensor 14a and a first actuator 16a. The first sensor 14a may include any type, style or manner of sensor for sensing some required piece of data for the second ECU 30a. The first actuator 16a is configured for controlling a specific operation of the vehicle, and may include any suitable type of actuator. The second ECU 30a controls the operation of the first actuator 16a. The second ECU 30a includes a first local symptom collector 12a that receives and collects the data from the first sensor 14a. The first local symptom collector 12a interfaces with a first software component 18a. The first software component 18a performs a system operation of the second ECU 30a. For example, the first software component 18a may calculate an output that the second ECU 30a uses to determine when to actuate the first actuator 16a.

The first ECU 20 is associated with and connected to a second sensor 14b and a third sensor 14c. The second sensor 14b and the third sensor 14c may include any type, style or manner of sensor for sensing some required piece of data for the first ECU 20. The first ECU 20 is also associated with and connected to a second actuator 16b and a third actuator 16c. The second actuator 16b and the third actuator 16c are each configured for controlling a specific operation of the vehicle, and may include any suitable type of actuator. The first ECU 20 controls the operation of the second actuator 16b and the third actuator 16c. The first ECU 20 includes a second local symptom collector 12b that receives and collects the data from the second sensor 14b and the third sensor 14c. The second local symptom collector 12b interfaces with a second software component 18b. The second software component 18b performs a system operation of the first ECU 20. For example, the second software component 18b may calculate an output that the first ECU 20 uses to determine when to actuate the second actuator 16b and/or the third actuator 16c.

The first ECU 20 includes a system state of health determination module 22. The system state of health determination module 22 receives an output from the second local symptom collector 12b internally, and from the first local symptom collector 12a of the second ECU 30a through the network bus 28. The system state of health determination module 22 analyzes the output from the first local symptom collector 12a and the second local symptom collector 12b to determine if one or more components of the vehicle network 10 are faulty or are otherwise not operating properly. For example, the system state of health determination module 22 may determine that one or both of the first ECU 20 and the Second ECU 30a are not functioning properly, that one or both of the first software component 18a and the second software component 18b are not functioning properly, that one or more of the first sensor 14a, the second sensor 14b or the third sensor 14c are not functioning properly, or that a communication link or signal between two or more of the various components of the vehicle network 10 is not functioning properly.

If the system state of health determination module 22 identifies a faulty component, then the system state of health determination module 22 notifies a reconfiguration manager 24. The reconfiguration manager 24 determines what type of component the identified faulty component is, i.e., a hardware component such as an ECU or a sensor, a software component, or a communications link or signal interconnecting one or more of the various vehicle network 10 components. Once the reconfiguration manager 24 has determined what type of component the faulty component includes, then the reconfiguration manager 24 triggers or instructs one of a reconfiguration signal manager 32 or a reconfiguration event manager 36. The reconfiguration manager 24 triggers the reconfiguration signal manager 32 when the faulty component is identified as a faulty sensor or communications link. The reconfiguration manager 24 triggers the reconfiguration event manger when the faulty component is a software component. If the faulty component is identified as an ECU, then the reconfiguration manager 24 may trigger both the reconfiguration signal manager 32 and the reconfiguration event manager 36. The reconfiguration event manager 36 may interact with middleware 38 to reallocate the task.

Figure 2:
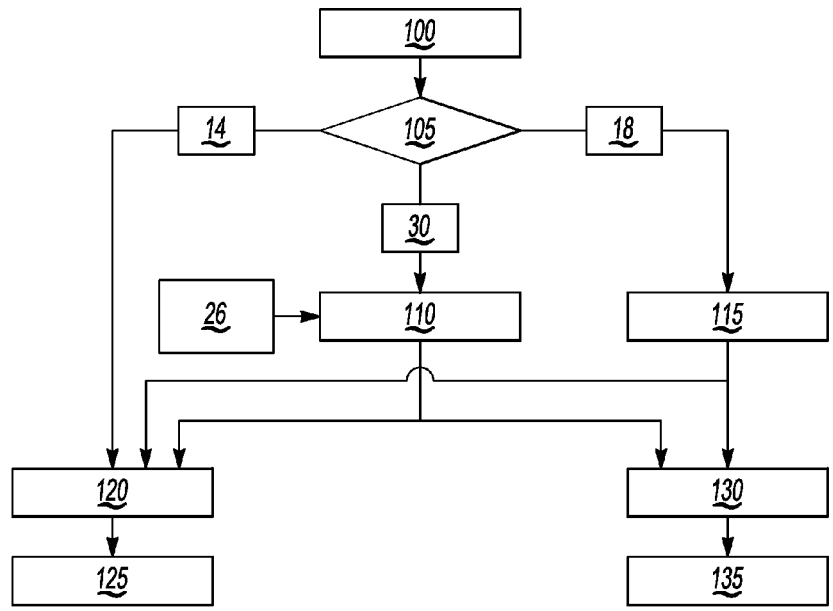
FIG. 2 is a flowchart showing the operation of a reconfiguration manager of the vehicle network.

Referring to FIG. 2, a flowchart of the reconfiguration manager 24 is shown. The reconfiguration manager 24 receives notification of a faulty component, indicated by block 100, by the system state of health determination module 22. The reconfiguration manager 24 then determines what type of component the faulty component includes, indicated by box 105.

If the faulty component is identified as a software component, indicated by box 18, then the reconfiguration manager 24 may re-allocate the software task for diverse implementation of the software task. Diverse implementation of the software task includes employing one or more software algorithms to achieve the same result as the faulty software component. Once the reconfiguration manager 24 has determined which standby software components 18 to re-allocate the software task to, the reconfiguration manager 24 then identifies the specific software tasks that need to be triggered, indicated by box 130. Once the specific software tasks have been identified, the reconfiguration manager 24 triggers or instructs the reconfiguration event manager 36 to implement the standby component, i.e., to implement the identified tasks that need to be completed in order to re-allocate the software task from the faulty software component to the standby component, indicated by box 135

If the faulty component is identified as a faulty sensor or communication link, indicated by box 14, then the reconfiguration manager 24 identifies which signals need to be re-allocated, indicated by box 120. The faulty signal or communication link is re-allocated from the standby component. When the faulty component is a faulty signal or communication link, the standby component may include an alternative sensor or an alternative ECU that is capable of producing the required information and re-routing the information to all required nodes. Once the reconfiguration manager 24 has identified which signals need to be re-routed, then the reconfiguration manager 24 instructs or triggers the reconfiguration signal manager 32 to implement the re-routing of the faulty signal or communication link, indicated by box 125

If the faulty component is identified as a faulty ECU, indicated by box 30, then the reconfiguration manager 24 identifies the software components of the faulty ECU that must be re-allocated. The reconfiguration manager 24 may reference a table of software components available on each ECU of the network 10, generally indicated by box 26, and identifies which ECU to re-allocate the critical software components of the faulty ECU to, generally indicated by box 110. Once the reconfiguration manager 24 has identified which ECU the critical software components of the faulty ECU are to be allocated to, the reconfiguration manager 24 may then identify software tasks that need to be completed in order to implement the critical software components, indicated by box 130, and may then trigger or instruct the reconfiguration event manager 36 to implement the identified tasks that need to be completed in order to re-allocate the software task from the faulty ECU component. In addition to re-allocating the software tasks in the event of a faulty ECU, the reconfiguration manager 24 may also identify signals or communication links, indicated by box 120, that need to be established to enable the standby components to complete the re-allocated software tasks. The reconfiguration manager 24 then instructs or triggers the reconfiguration signal manager 32 to implement the re-routing of the required signals or communication links, indicated by box 125.

Figure 3:
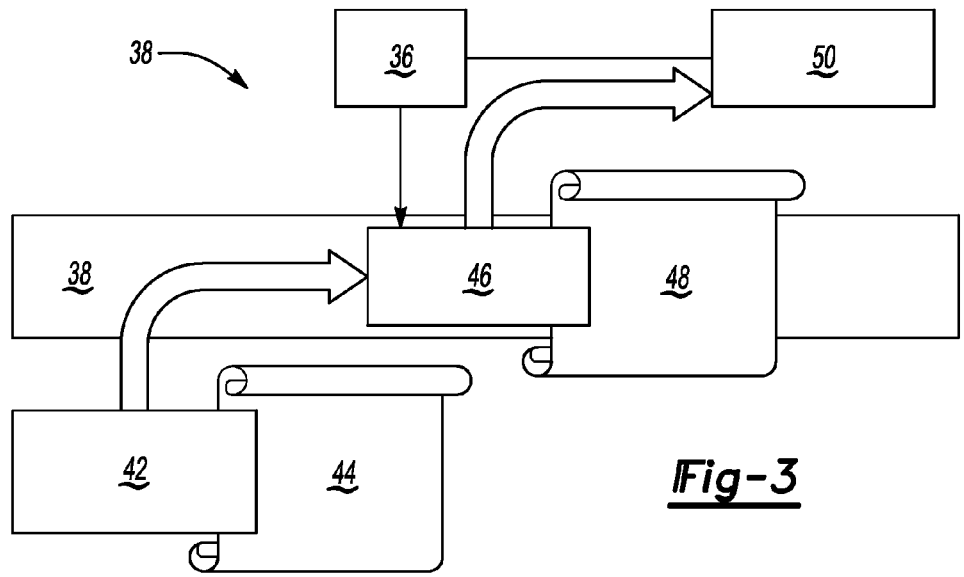
FIG. 3 is a schematic diagram showing a reconfiguration event manager reallocating a task to a standby component.

Referring to FIG. 3, the details of how the reconfiguration events are used in the middleware 38 and operating system 42 components to mimic dynamic allocation on a statically allocated architecture are shown using AUTOSAR as an example of a statically allocated software architecture. In AUTOSAR, tasks are statically allocated and statically scheduled by an operating system 42 by means of a static schedule table 44. The body 46 of each task scheduled by the operating system 42, however, is under the control of the middleware 38 layer, called the RTE (Run-Time Environment). Runnable entities (called "Runnables" for short) within tasks are invoked by a second-level schedule table 48 within the RTE. Events generated by the Reconfiguration Event Generator could either trigger Runnables in the RTE schedule table 48, or tasks in the operating system 42 schedule table 44. Either way, the idea is that operating system 42 tasks or RTE runnables have been statically allocated at system design and build time, but they are dormant until the triggering event notifies them that they are to be activated, thus mimicking the end result of dynamic software re-allocation or reconfiguration.

Figure 4:
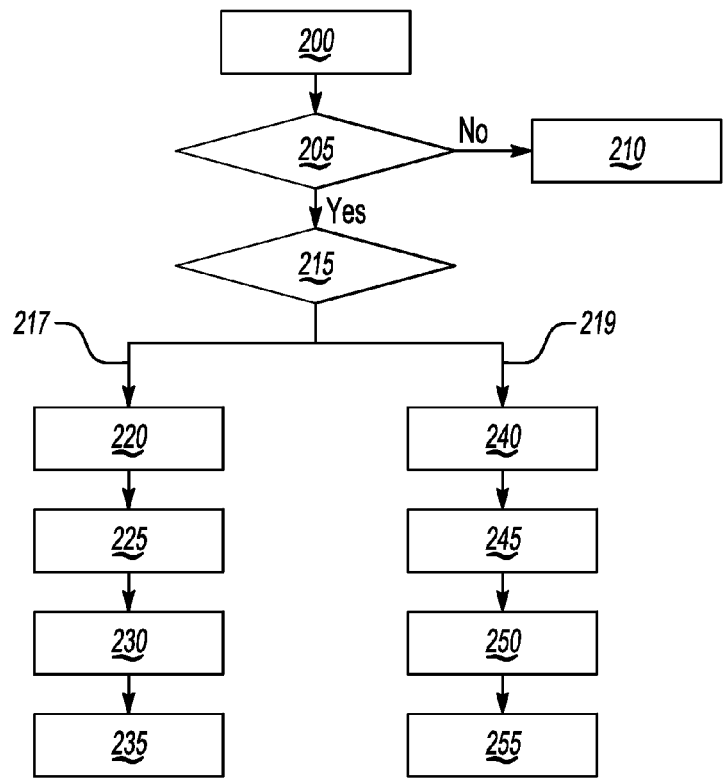
FIG. 4 is a flowchart showing the operation of a reconfiguration signal manager of the vehicle network.

Referring to FIG. 4, a flowchart of the reconfiguration signal manager 32 is shown. The reconfiguration signal manager 32 is notified of a faulty signal or communications link, indicated by box 200. The reconfiguration signal manager 32 then determines if data reconfiguration for the faulty signal or communications link is possible, indicated by box 205. If data reconfiguration for the faulty signal is not possible, then the reconfiguration signal manager 32 broadcasts failsafe values for the faulty signal or communications link to the network 10, indicated by block 210. If data reconfiguration for the faulty signal is possible, then the reconfiguration signal manager 32 then determines the type of redundancy in the system, generally indicated at 215. The determination that network level redundancy exists is indicated at 217. The determination that ECU level redundancy exists is indicated at 219.

Figure 5:
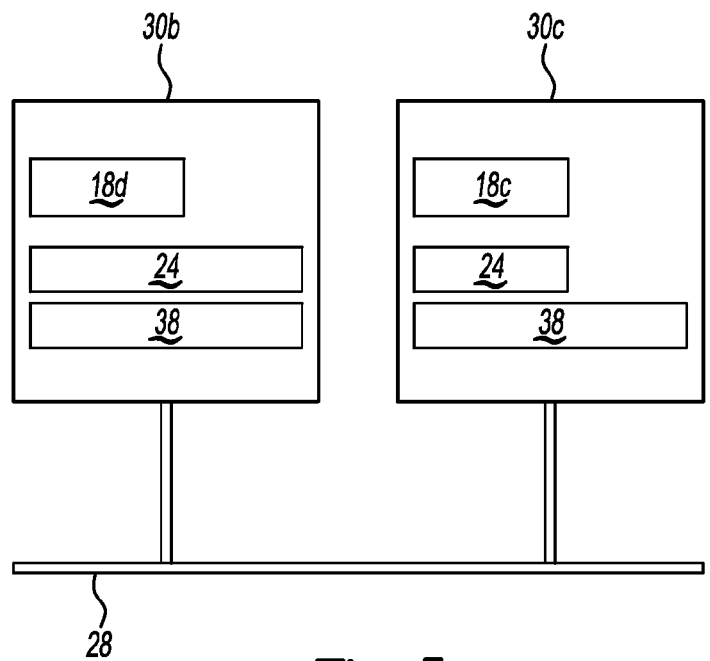
FIG. 5 is a schematic diagram showing a network level redundancy for task re-allocation.

If the reconfiguration signal manager 32 determines that network level redundancy exists, then the reconfiguration signal manager 32 may reconfigure the signal routing table, generally indicated at 220. The signal routing table is a table of identifying where each signal is routed to and/or from, and is reconfigured to indicate that the signal from the faulty component is now coming from the standby component. Referring to FIGS. 4 and 5, the reconfiguration signal manager 32, shown in FIG. 1, may then deactivate the signal from the primary software component 18c, i.e., the faulty software component, and may activate the signal from the standby software component 18d, generally indicated at box 225. This is done so that only a single, accurate signal is broadcast across the network 10. The reconfiguration signal manager 32 may then assign network 10 timing attributes to the signal from the standby component, indicated at box 230. The reconfiguration signal manager 32 may then notify all signal receivers of the signal reconfiguration, i.e., that the signal is now coming from the standby component instead of the primary or faulty component, indicated by box 235

Referring to FIG. 5, an example of network 10 level redundancy is shown. The network 10 level redundancy includes a third ECU 30b and a fourth ECU 30c. The fourth ECU 30c includes a primary software component 18c. The third ECU 30b includes a standby software component 18d. When the faulty component is identified as a signal from the primary software component 18c, then the reconfiguration signal manager 32 reroutes the responsibility of the signal from the primary software component 18c to the standby software component 18d.

Referring back to FIG. 4, if the reconfiguration signal manager 32 determines that ECU level redundancy exists, and then the reconfiguration signal manager 32 may reconfigure the signal routing table, generally indicated at 240. The reconfiguration signal manager 32 may then use the standby component to compute the signal, indicated by box 245. The reconfiguration signal manager 32 may then deactivate the signal from the primary software component 18c, i.e., the faulty software component, and may activate the signal from the standby software component 18d, generally indicated at box 250. The reconfiguration signal manager 32 may then transmit the signal to the network 10 through the network bus 28, as well as to other internal ECU functions, indicated by box 255. The frequency of signal transmission (periodic data transmission, periodic based on event, change on event transmission, etc.) is controlled by the reconfiguration signal manger 32, which currently owns the signal. A common strategy to transfer ownership implicitly, e.g., via timeout, or explicitly, e.g., via handshake signals, may be executed over the communication network 10.

Figure 6:
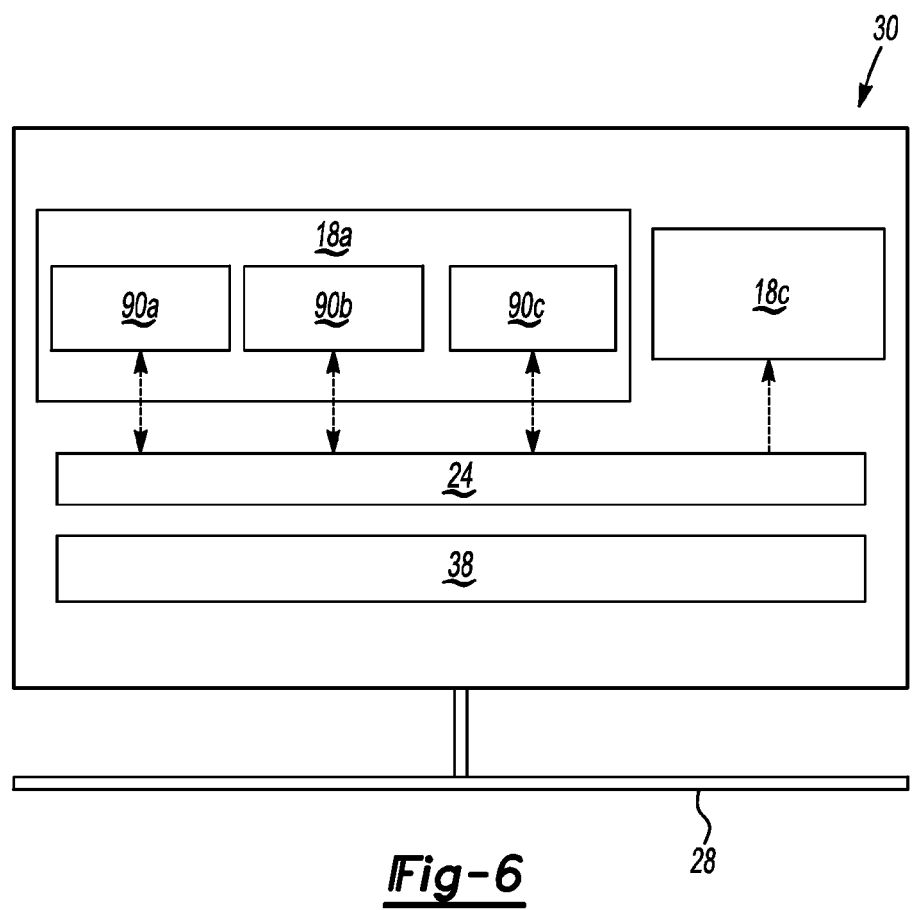
FIG. 6 is a schematic diagram showing an Electronic Control Unit level redundancy for task re-allocation.

Referring to FIG. 6, an example of ECU level redundancy is shown. The ECU 30 includes the first software component 18a. The first software component 18a includes a primary task 90a, a first standby task 90b and a second standby task 90c. If the faulty signal is identified as originating from the primary task 90a of the first software component 18a, then the reconfiguration signal manager 32 may switch the software task to one of the first standby task 90b or the second standby task 90c, thereby activating the signal from one of the first standby task 90b or the second standby task 90c and deactivating the signal from the primary task 90a.

While the best modes for carrying out the invention have been described in detail, those familiar with the art to which this invention relates will recognize various alternative designs and embodiments for practicing the invention within the scope of the appended claims.

The invention claimed is:

1. A method of dynamically allocating one of a task and data/signal information on a statically embedded architecture of a vehicle, the method comprising:
  analyzing a system operation to identify a faulty component;
  identifying one of a task performed by the identified faulty component and data/signal information associated with the faulty component;
  re-allocating the one of the task performed by the faulty component and the data/signal information associated with the faulty component to a statically allocated and embedded standby component so that performance of the re-allocated task for future system operations is performed by the standby component;
  determining if the standby component and the faulty component are co-associated with a common electrical control unit, or if the standby component and the faulty component are not co-associated with the common electrical control unit;
  re-configuring an internal signal routing table of the common electrical control unit when the standby component and the faulty component are co-associated with the common electrical control unit; and
  re-configuring a network signal routing table when the standby component and the faulty component are not co-associated with the common electrical control unit.

2. A method as set forth in claim 1 wherein the faulty component includes one of a hardware component, a software component or a signal.

3. A method as set forth in claim 1 wherein the identified faulty component is associated with a first electrical control unit, and wherein the standby component is also associated with the first electrical control unit.

4. A method as set forth in claim 1 wherein the identified faulty component is associated with a first electrical control unit, and wherein the standby component is associated with a second electrical control unit.

5. A method as set forth in claim 1 wherein identifying a task performed by the faulty component includes determining what type of component the faulty component includes.

6. A method as set forth in claim 5 wherein determining what type of component the faulty component includes is further defined as determining if the faulty component is one of a signal or communications link, an electrical control unit or hardware component, or a software component.

7. A method as set forth in claim 6 wherein identifying a task performed by the faulty component includes one of identifying a signal sent by the faulty component or identifying a software task performed by the faulty component.

8. A method as set forth in claim 7 further comprising determining if data re-configuration is possible.

9. A method as set forth in claim 8 further comprising substituting pre-determined fail safe data values when it is determined that data re-configuration is not possible.

10. A method as set forth in claim 8 further comprising deactivating a signal from the faulty component.

11. A method as set forth in claim 10 further comprising activating a signal from the standby component.

12. A system for dynamically allocating one of a task and data/signal information on a statically embedded architecture of a vehicle, the system comprising:
  a network;
  a plurality of electronic control units in operative communication with each other and with the network;
  wherein each of the plurality of electronic control units includes a local symptom collector;
  wherein at least one of the plurality of electronic control units includes a state of health determination module;
  wherein the state of health determination module is in operative communication with the plurality of electronic control units and the network;
  wherein the state of health determination module is configured to identify a fault condition using an output from the local symptom collectors, and provide fault condition information to a reconfiguration manager, wherein the reconfiguration manager is configured to trigger reallocation of at least one of a task or data/signal information associated with the identified faulty condition to a standby component;
  an internal signal routing table associated with a common electronic control unit, wherein the internal signal routing table is reconfigurable to re-allocate one of a task associated with the identified faulty condition and a signal associated with the identified faulty condition when the standby component and the identified faulty condition are co-associated with the common electrical control unit; and
  a network signal routing table associated with all of the plurality of electronic control units, wherein the network signal routing table is reconfigurable to re-allocate one of a task associated with the identified faulty condition and a signal associated with the identified faulty condition when the standby component and the identified faulty condition are not co-associated with a single electronic control unit of the plurality of electronic control units.

13. A system as set forth in claim 12 further comprising a reconfiguration signal manager and a reconfiguration event manager, each in operational communication with the reconfiguration manager, wherein the reconfiguration signal manager is configured to re-allocate data/signal information associated with the identified faulty condition and the reconfiguration event manager is configured to re-allocate one of a software component and a hardware component associated with the identified faulty condition.

14. A system as set forth in claim 12 wherein the identified faulty condition includes one of a faulty hardware component, a faulty software component or a faulty signal.

15. A system as set forth in claim 12 wherein the at least one state of health determination module includes a plurality of state of health determination modules, with each of the plurality of state of health determination modules is operable on a different electronic control unit and are in communication with each other through an agreement protocol to agree on the state of health of the vehicle.

\* \* \* \* \*